(No Model.)
T. B. PERKINS.
PHOTOGRAPHIC PRINTING FRAME.
No. 581,831. Patented May 4, 1897.
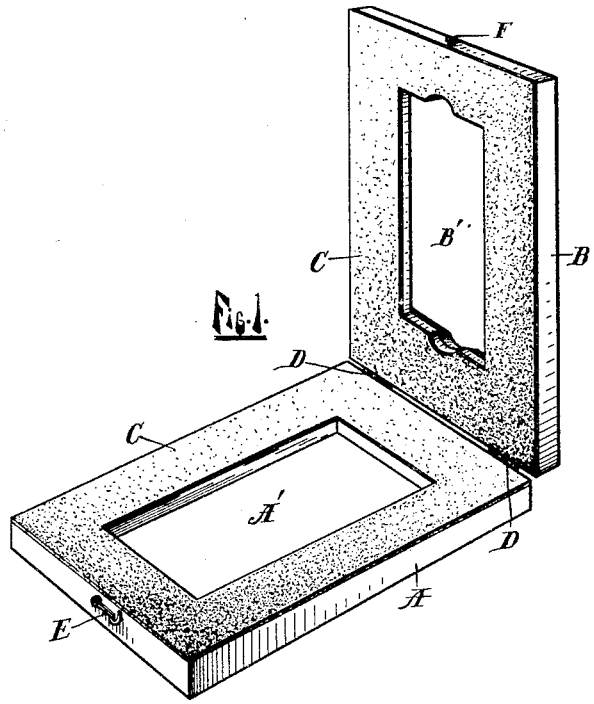
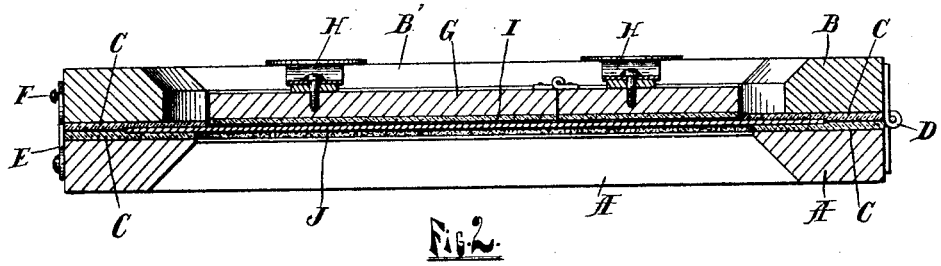
WITNESSES:
Lewis E. Flanders
Lois Moulton
INVENTOR:
Thomas B. Perkins
BY
Luther V. Moulton
Attorney

UNITED STATES PATENT OFFICE.

THOMAS B. PERKINS, OF GRAND RAPIDS, MICHIGAN.

PHOTOGRAPHIC-PRINTING FRAME.

SPECIFICATION forming part of Letters Patent No. 581,831, dated May 4, 1897.

Application filed February 4, 1896. Serial No. 577,983. (No model.)

*To all whom it may concern:*

Be it known that I, THOMAS B. PERKINS, a citizen of the United States, residing at Grand Rapids, in the county of Kent and State of Michigan, have invented certain new and useful Improvements in Photographic-Printing Frames; and I do hereby declare the following to be a full, clear, and exact description of the invention, such as will enable others skilled in the art to which it appertains to make and use the same.

My invention relates to improvements in photographic-printing frames; and its objects are to provide means for accurately registering the paper upon the image in the negative, for adjusting and holding the negative to the openings in the frames, and to provide a frame adapted to various sizes of negatives, and also for printing from films. I accomplish these objects by the construction hereinafter more fully described, and particularly pointed out in the claim, reference being had to the accompanying drawings, in which—

Figure 1 is a perspective of the frames only; and Fig. 2, a longitudinal section of the device complete, together with the negative and paper.

A and B represent two frames having substantially the same outside dimensions and separably attached to each other, preferably by hinges D at one end and a hook E and stud F at the other end.

The frame A has a central opening A' to admit light and of not less than the dimensions of the prints to be made, and the frame B has a similar opening of the dimensions of a piece of paper to be printed. One or both of said frames are provided on their adjacent faces with elastic facings C, preferably of felt, which facings will yield to accommodate various thicknesses of glass in the negative J and firmly hold the same in place without undue strain or risk of breakage, and both frames have plane adjacent surfaces which permit of freely adjusting the negative relative to the openings in said frames to suitably locate the image in the negative relative to the outlines of said openings.

G represents the ordinary padded pressure-back fitted within the opening B' and having springs H to press said back against the paper I and hold the same in proper contact with the negative.

By the described construction negatives of various sizes may be adjusted and clamped between said frames, and thus securely held in place by the elastic facings C. The opening B' being of the same dimensions of the paper to be printed will accurately register each piece of paper upon the negative without any attention to that matter on the part of the operator. In printing films the elastic facing engages and holds the film against the plain glass. Any portion of a continuous film of such width that it will go between the fastenings of the frame may be printed, the ends of the said film being allowed to project beyond the frames.

Having thus fully described my invention, what I claim is—

As an improved article of manufacture, the herein-described photographic-printing frame, consisting of two frames hinged to each other at one side and separably secured at the other side, said frame having plain adjacent surfaces provided with elastic facings, and one of said frames having an opening of not less than the dimensions of the prints to be made and the other of said frames having an opening of the same dimensions as the paper to be printed, and a removable spring-pressed backing fitting the latter opening, substantially as described.

In testimony whereof I affix my signature in presence of two witnesses.

THOMAS B. PERKINS.

Witnesses:
 LUTHER V. MOULTON,
 LEWIS E. FLANDERS.